J. D. ALLEN.
REVERSIBLE TURBINE ENGINE.
APPLICATION FILED JUNE 2, 1915.

1,186,726.

Patented June 13, 1916.
3 SHEETS—SHEET 1.

WITNESSES:
L. J. Forde.
Thos Castberg

INVENTOR
John. D. Allen.
BY G. H. Strong.
ATTORNEY

J. D. ALLEN.
REVERSIBLE TURBINE ENGINE.
APPLICATION FILED JUNE 2, 1915.

1,186,726.

Patented June 13, 1916.
3 SHEETS—SHEET 2.

WITNESSES:
L. J. Forde
Thos. Castberg

INVENTOR
John D. Allen.
BY G. H. Strong.
ATTORNEY

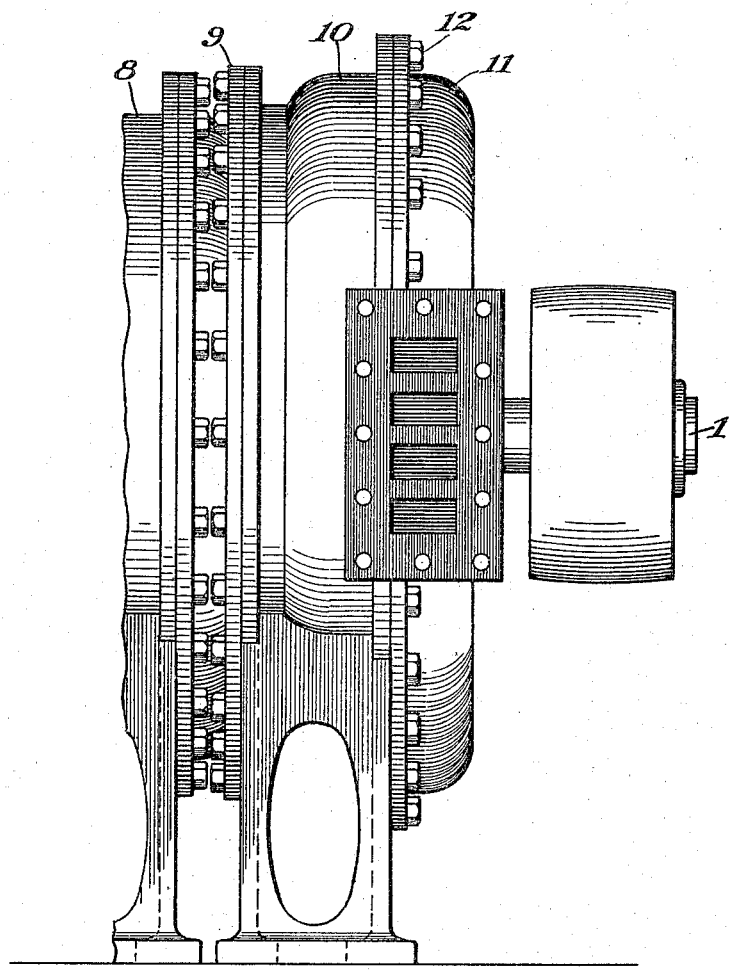

UNITED STATES PATENT OFFICE.

JOHN D. ALLEN, OF SAN FRANCISCO, CALIFORNIA.

REVERSIBLE TURBINE-ENGINE.

1,186,726. Specification of Letters Patent. Patented June 13, 1916.

Application filed June 2, 1915. Serial No. 31,703.

*To all whom it may concern:*

Be it known that I, JOHN D. ALLEN, a citizen of the United States, residing in the city and county of San Francisco, and State of California, have invented new and useful Improvements in Reversible Turbine-Engines, of which the following is a specification.

This invention relates to a reversible turbine engine.

One of the objects of the present invention is to provide a fluid-propelled engine of the turbine type, in which is mounted a plurality of rotors of increasing diameters, and in which each rotor is provided with two sets of radially disposed vanes, one set of vanes for variable speeds ahead and the other set for variable speeds reverse.

Another object of the invention is to provide a novel form of casing or housing for the rotors, together with means for controlling and directing the flow of fluid either into one set of vanes or the other.

Further objects will hereinafter appear.

The invention consists of the parts and the construction and combination of parts as hereinafter more fully described and claimed, having reference to the accompanying drawings, in which—

Figure 1:
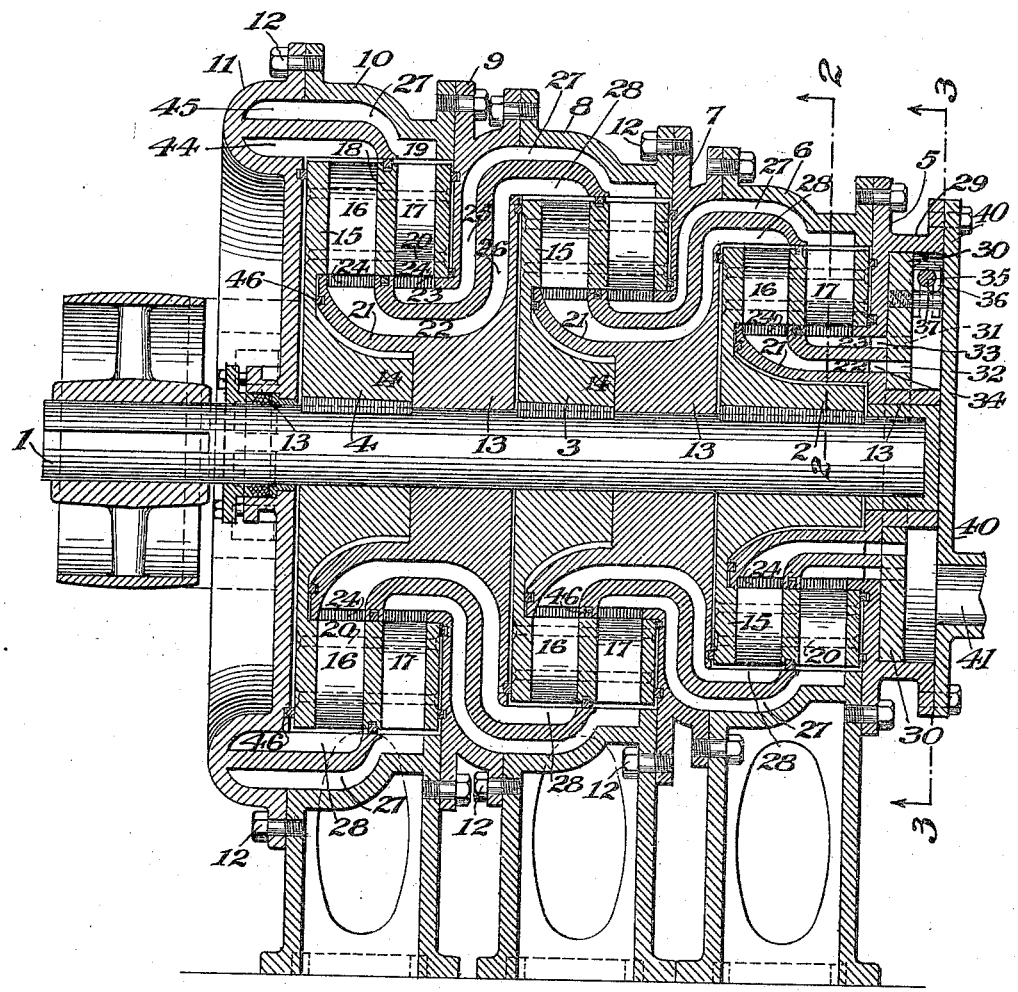
Figure 2:
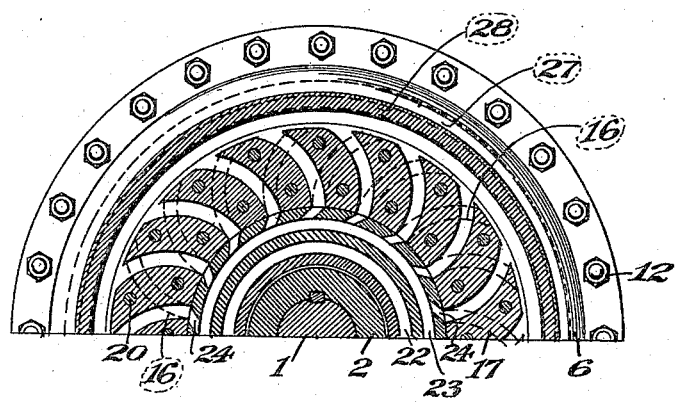
Figure 3:
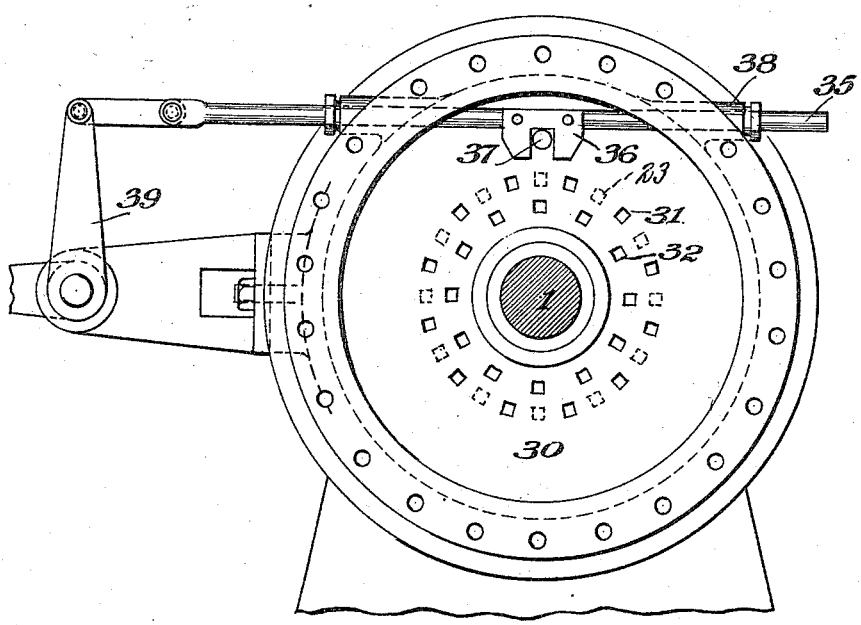

Figure 1 is a side elevation of the turbine engine, partly in section. Fig. 2 is a cross section on line 2—2 of Fig. 1. Fig. 3 is a cross section on line 3—3 of Fig. 1. Fig. 4 is a side elevation, partly broken away, showing the position of the exhaust ports.

A indicates in general the casing of the turbine in which the driving shaft 1, carrying the rotors 2, 3 and 4, is journaled. The casing is built up of sections, such as indicated at 5, 6, 7, 8, 9, 10 and 11, all of which are cored out to form annular passages through which the steam is conveyed from one rotor to the other. The several sections are secured together as a unit by means of bolts 12, and sections 5, 7, 9 and 11 are provided with central bearings 13 to support the driving shaft. Each rotor employed in the present instance consists of a hub section 14 with which is formed integrally, or otherwise secured, a disk 15. This disk is provided with two sets of vanes 16 and 17, having curved faces reversed to each other, which are mounted between rings 18 and 19; the rings and vanes being in turn secured to the disk by means of bolts or rivets 20.

The casing sections 5, 7 and 9 are provided with hub-like members, such as indicated at 21. These hubs are so positioned as to extend inwardly between the vanes of the runner and the hub of the disk by which they are supported. Each hub member 21 is provided with two separated, annular chambers 22 and 23 from which the steam or driving fluid is permitted to escape through a plurality of nozzle-like slots 24. The annular chambers 22 and 23 are horizontally disposed and are cored out integrally with vertically disposed, annular chambers 25 and 26 formed in the casing sections 7 and 9.

Formed in the casing sections 6, 8 and 10 are two separated annular chambers 27 and 28 which are provided for the purpose of receiving the steam discharging from the vanes 16 and 17, and these annular chambers are so positioned as to communicate or connect with the vertically disposed annular chambers 25 and 26 previously mentioned. The casing sections 5 and 11 are not only provided for the purpose of closing up the ends of the casing as a whole, but are also constructed to perform other functions.

Cast integrally with the casing section 5 is an annularly disposed flange 29, and mounted interiorly of said flange is a circular, disk-shaped valve 30 in which is formed two sets of admission ports 31 and 32. These admission ports are arranged in the form of a circle and each circle consists of a plurality of ports which are offset with relation to each other. These ports are adapted to register with similarly disposed ports 33 and 34 formed in the inner end of the first hub section 21 and communicate with the annular chambers 22 and 23 respectively. The circular, disk-shaped valve 30 is mounted exteriorly of the bearing member 13 formed on section 5 and is adapted to be turned about same by means of a horizontally disposed rod 35. A collar 36, having a fork-shaped projection formed thereon engaging with a pin 37 secured in the face of the disk, forms the connection between the rod and the disk, through which turning movement is transmitted. The rod projects through stuffing boxes 38 and is in this instance reciprocated to turn the valve to one side or the other by means of a bell-crank lever 39.

The chamber formed by the annular flange 29, interiorly of which the valve 30 is mounted, will hereinafter be known as the "steam chest", said chamber being inclosed by means of a cover plate 40. Steam is supplied to said chamber from any suitable source through a pipe 41.

In operation, with the steam turned on and the valve moved into a position where the ports 32 are in register with the ports 34 and the annular chamber 22, it will be seen that the steam is permitted to discharge through the nozzle-like openings formed in the hub and communicating with chamber 22. The steam thus discharged impinges on the face of vane 16, causing the rotor to revolve in a forward direction. The steam after passing through the vane 16 escapes into the annular discharge passage 28. It then passes down through passage 26 into the annular chamber 22 formed in the casing section 7. It is here again permitted to discharge through the nozzle-like openings 24 into vane 16 secured on rotor 3 and is again permitted to escape into the annular discharge passage 28, from where it is conducted into the blades 16 carried by the rotor 4. It is finally permitted to discharge through the annular discharge passage 28 which, in this instance, is connected with an exhaust chamber 44 formed in the casing section 11. The steam admitted through the ports 32 formed in the valve 30 is in this manner permitted to pass through the vanes 16 carried by the several rotors; said rotors being of increasing diameter to permit expansion of the steam in the usual manner. The speed of the turbine is regulated by throttling the steam admitted; this being accomplished by turning the disk valve into a position where the coöperating ports are only slightly opened.

If it is desired to reverse the turbine engine, it is only necessary to turn the valve by means of the lever 39 and rod 35 until the ports 31 move into register with ports 33 which communicate with the annular chamber 23 formed in the hub 21 of the casing section 5. The steam will then flow through the vanes 17 and escape into the annular discharge passage 27. It will then be directed through the annular passage 25 into the chamber 23 and the next casing section 7 and is here again permitted to discharge into vanes 17 of the succeeding rotor. It is similarly conducted through the vanes 17 on the last and largest rotor and finally permitted to escape through the annular discharge chamber 27, which, in this instance, is connected with an exhaust chamber 45 formed in the casing section 11; the exhaust steam entering chambers 44 and 45 being taken care of in the usual manner by a condenser or like means (this forming no part of the present invention).

For the purpose of preventing unnecessary leakage of steam around the rotors or from one set of vanes into the other, a plurality of packing rings, such as indicated at 46, have been provided. These are not only positioned on the inner and outer faces of the rotors but also on the sides of the rings and disks.

A turbine engine constructed as here shown is simple and substantial in construction, efficient in action, and easy to operate; the change in direction of revolution from ahead to reverse, or vice versa, being controlled entirely by the movement of the valve 30 and the passage of the steam through one set of vanes or the other. The vanes 16 are employed for all speeds ahead and vanes 17 for reversing purposes. The same power may be transmitted in either direction as the areas of the vanes 16 and 17 are substantially the same. The number of vanes employed and exact shape provided may be varied to suit conditions or speeds required.

The materials and finish of the several parts of the engine are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. A reversible turbine engine comprising a casing, said casing consisting of a central section and two end sections, a rotor inclosed by the casing sections and journaled therein, a steam chest formed on one of the casing sections, two sets of oppositely disposed vanes secured to the rotor, a hub-like member connected with the steam chest and positioned interior of the vanes of the rotor, said hub-like member having two sets of ports formed therein, one port connecting with one set of vanes and the steam chest and the other port connecting with the other set of vanes and the steam chest, said ports forming annular chambers in the hub-like member, with a plurality of angularly disposed nozzle-like outlets communicating with the inlet side of the vanes, and port-like openings at the other end communicating with the steam chest, a disk-shaped valve turnably mounted in the steam chest, said valve having ports formed therein adapted to be moved into or out of register with the ports connecting with the annular ports, and means for turning the valve.

2. A reversible turbine engine comprising a casing, said casing consisting of a central section and two end sections, a rotor inclosed by the casing sections and journaled therein, a steam chest formed on one of the casing sections, two sets of oppositely disposed vanes secured to the rotor, a hub-like member connected with the steam chest and positioned interior of the vanes of the rotor, said hub-like member having two sets of ports formed therein, one port connecting with one set of vanes and the steam chest and the other port connecting with the other set of vanes and the steam chest, said ports forming annular chambers in the hub-like member, with a plurality of angularly disposed nozzle-like outlets communicating with the inlet side of the vanes, and port-like openings at the other end communicating with the steam chest, a disk-shaped valve turnably mounted in the steam chest, said valve having ports formed therein adapted to be moved into or out of register with the ports connecting with the annular ports, means for turning the valve, said means comprising a rod reciprocally mounted in the steam chest, said rod having a fork-shaped member secured thereon engageable with a pin on the valve, and a crank arm attached to the rod.

3. A reversible turbine engine comprising a casing, said casing consisting of a central section and two end sections, a rotor inclosed by the casing sections and journaled therein, a steam chest formed on one of the casing sections, two sets of oppositely disposed vanes secured to the rotor, a hub-like member connected with the steam chest and positioned interior of the vanes of the rotor, said hub-like member having two separated annular chambers formed therein connected at one end with the steam chest, said hub-like member also having two sets of nozzle-like ports formed therein communicating at one end with the inlet side of the vanes and at the other with the annular chambers, there being one set of nozzle ports for each set of vanes and annular chambers, a pair of annular passages formed in the central casing section exteriorly of the vanes, one for each set of vanes, to receive the discharging steam from same, and means for admitting steam into one or the other of the annular chambers.

4. A reversible turbine engine comprising a casing, said casing consisting of a central section and two end sections, a rotor inclosed by the casing sections and journaled therein, a steam chest formed on one of the casing sections, two sets of oppositely disposed vanes secured to the rotor, a hub-like member connected with the steam chest and positioned interiorly of the vanes of the rotor, said hub-like member having two sets of ports formed therein, one port connecting with one set of vanes and the steam chest and the other port connecting with the other set of vanes and the steam chest, said ports forming annular chambers in the hub-like member, with a plurality of angularly disposed nozzle-like outlets communicating with the inlet side of the vanes, and port-like openings at the other end communicating with the steam chest, and means in the steam chest for admitting steam into one or the other set of communicating ports.

5. A reversible turbine engine comprising a casing, said casing consisting of a central section and two end sections, a rotor inclosed by the casing sections and journaled therein, a steam chest formed on one of the casing sections, two sets of oppositely disposed vanes secured to the rotor, a hub-like member connected with the steam chest and positioned interiorly of the vanes of the rotor, said hub-like member having two sets of ports formed therein, one port connecting with one set of vanes and the steam chest and the other port connecting with the other set of vanes and the steam chest, said ports forming annular chambers in the hub-like member, with a plurality of angularly disposed nozzle-like outlets communicating with the inlet side of the vanes, port-like openings at the other end communicating with the steam chest, means in the steam chest for admitting steam into one or the other set of communicating ports, and means for regulating the volume of steam admitted.

In testimony whereof I have hereunto set my hand in the presence of two subscribing witnesses.

JOHN D. ALLEN.

Witnesses:
JOHN H. HERRING,
W. W. HEALY.

Copies of this patent may be obtained for five cents each, by addressing the "Commissioner of Patents, Washington, D. C."